United States Patent [19]

Snow et al.

[11] Patent Number: 5,442,909
[45] Date of Patent: Aug. 22, 1995

[54] CONTROL SYSTEM FOR LIMITING THE VECTOR ANGLE IN AN AXISYMMETRIC VECTORING EXHAUST NOZZLE

[75] Inventors: Barton H. Snow, Wyoming; David J. Markstein, Hamilton; Thomas K. Wills, Milford, all of Ohio; Thomas P. Schmitt, Schenectady, N.Y.

[73] Assignee: General Electric Company, Cincinnati, Ohio

[21] Appl. No.: 242,473

[22] Filed: May 13, 1994

[51] Int. Cl.[6] .............................................. F02K 1/00
[52] U.S. Cl. ...................................... 60/204; 60/230; 60/233
[58] Field of Search .................. 60/204, 228, 230, 232, 60/233, 271; 239/265.19, 265.33, 265.35, 265.37, 265.39, 265.41; 244/12.5, 23 D, 52

[56] References Cited

U.S. PATENT DOCUMENTS

| | | | |
|---|---|---|---|
| 4,978,071 | 12/1990 | MacLean et al. | 239/265.19 |
| 4,994,660 | 2/1991 | Hauer | 239/265.41 |
| 5,039,014 | 8/1991 | Lippmeier | 239/265.39 |
| 5,076,496 | 12/1991 | Lippmeier | 239/265.41 |
| 5,082,182 | 1/1992 | Bruchez, Jr. et al. | 239/265.35 |
| 5,150,839 | 9/1992 | Reedy | 239/265.41 |
| 5,174,502 | 12/1992 | Lippmeier et al. | 239/265.41 |
| 5,239,815 | 8/1993 | Barcza | 60/228 |
| 5,245,823 | 9/1993 | Barcza | 60/228 |
| 5,267,436 | 12/1993 | Wood et al. | 60/204 |
| 5,379,585 | 1/1995 | Snow et al. | 60/204 |

Primary Examiner—Louis J. Casaregola
Attorney, Agent, or Firm—Andrew C. Hess; Bernard E. Shay

[57] ABSTRACT

A method for controlling the amount of side load experienced by a gas turbine engine and associated airframe components is provided, where the gas turbine engine includes a thrust vectoring system which deflects thrust at a vector angle away from a centerline thereof. The method includes the steps of calculating engine thrust, calculating a side load vector angle limit as a function of the calculated engine thrust and a side load limit, and limiting the vector angle of the thrust vectoring system to the side load vector angle limit in order to maintain operation of the gas turbine engine within the side load limit.

21 Claims, 6 Drawing Sheets

CONTROL SYSTEM FOR LIMITING THE VECTOR ANGLE IN AN AXISYMMETRIC VECTORING EXHAUST NOZZLE

BACKGROUND OF THE INVENTION

1. Field of the Invention

This invention relates generally to vectoring exhaust nozzles in jet engines and, more particularly, to a control system for limiting the vector angle in an axisymmetric vectoring exhaust nozzle of a jet engine.

2. Description of Related Art

For military aircraft applications, there exists a need to increase the maneuverability of the aircraft for both air to air combat missions and complicated ground attack missions. Accordingly, aircraft designers are replacing or augmenting the use of conventional aerodynamic surfaces, such as flaps and ailerons, with vectorable nozzles which turn or vector the exhaust flow and thrust of the gas turbine engine powering the aircraft. U.S. Pat. No. 4,994,660, to Hauer, discloses an Axisymmetric Vectoring Exhaust Nozzle (AVEN® nozzle) that provides a means for vectoring the thrust of an axisymmetric convergent/divergent nozzle by universally pivoting the divergent flaps of the nozzle in an axisymmetric fashion; or, in other words, pivoting the divergent flaps in radial and tangential directions with respect to the unvectored nozzle centerline. Previously, two dimensional nozzles have used vectored thrust means that employ relatively flat flaps to direct the pitch or yaw direction of the engine's thrust.

Deflection of the engine thrust away from the engine centerline by the thrust vectoring system causes a side thrust (or load) on the tailpipe, ducting, engine mounts and airframe structure. These side loads, which are additive to gravitational forces, must be controlled in order to maintain the structures within design limits.

It is therefore one object of the present invention to provide a control system for limiting the vector angle in a thrust vectoring exhaust nozzle.

It is another object of the present invention to provide a control system for limiting the vector angle in a thrust vectoring exhaust nozzle which maintains side loads on the engine and airframe structures within design limits.

These objects and other features and advantages will become more readily apparent in the following description when taken in conjunction with the appended drawings.

SUMMARY OF THE INVENTION

A method for controlling the amount of side load experienced by a gas turbine engine and associated airframe components is provided, where the gas turbine engine includes a thrust vectoring system which deflects thrust at a vector angle away from a centerline thereof. The method includes the steps of calculating engine thrust, calculating a side load vector angle limit as a function of the calculated engine thrust and a side load limit, and limiting the vector angle of the thrust vectoring system to the side load vector angle limit in order to maintain operation of the gas turbine engine within the side load limit.

BRIEF DESCRIPTION OF THE DRAWINGS

While the specification concludes with claims particularly pointing out and distinctly claiming the present invention, it is believed that the same will be better understood from the following description taken in conjunction with the accompanying drawing in which:

DETAILED DESCRIPTION OF THE INVENTION

Figure 1:
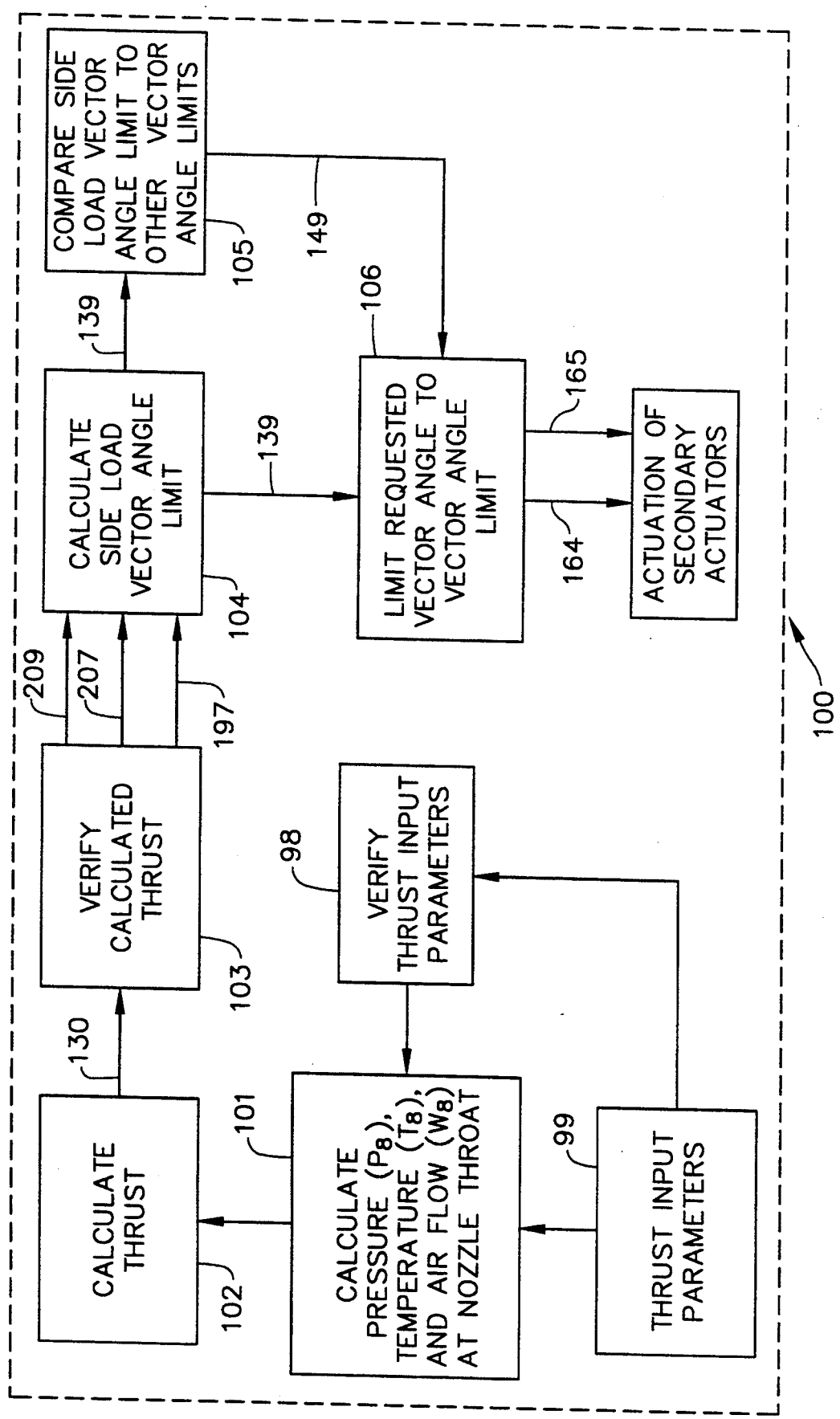
FIG. 1 is a block diagram of the logic flow of the control system of the present invention.

Referring now to the drawings in detail, wherein identical numerals indicate the same elements throughout the figures, FIG. 1 depicts an overall configuration of a control system 100 for a thrust vectoring exhaust nozzle of a gas turbine engine which limits the available vector angle to permit acceptable side loads. An exemplary nozzle is the Axisymmetric Vectoring Exhaust Nozzle (AVEN®) shown and described in U.S. Pat. No. 4,994,660 to Hauer, which is hereby incorporated by reference. As seen in the Hauer reference, the nozzle comprises in serial flow relationship a convergent section, a throat, and a divergent section. The throat is generally considered to be at station 8 of the gas turbine engine and has associated with it a throat area conventionally denoted as A8. The nozzle exit, generally considered to be at station 9 of the gas turbine engine, likewise has associated with it an exit area conventionally denoted as A9.

While U.S. Pat. No. 4,994,660 clearly describes the mechanical interaction of the AVEN® nozzle components in more detail, it is useful to note that throat area A8 is controlled by a primary ring structure which is translated forward and aft by a plurality of primary actuators. Translation of a secondary actuation ring, which is provided by a plurality of secondary actuators, opens and closes the nozzle exit to provide control of nozzle exit area A9. In particular, there are provided three secondary actuators which are circumferentially disposed at the 12 o'clock, 4 o'clock, and 8 o'clock positions (when viewed from aft looking forward).

As described in the Hauer reference, the secondary actuators are utilized to tilt the secondary actuating ring, thereby causing certain secondary flaps to pivot and produce thrust vectoring. By thrust vectoring, it is meant that the AVEN® nozzle can direct the thrust produced by the gas turbine engine in both a radial and tangential direction to a centerline of the nozzle. This can be done in various manners to affect the pitch (up-down) and yaw (left-right) directions of the aircraft.

Even though the vectoring angle of the engine thrust by the AVEN® nozzle is already limited by other considerations (e.g., mechanical or kinematic limits of the nozzle, flow separation limits, etc.), it has been found that another limitation of the vectoring angle must be taken into account due to side (or lateral) thrust loads imposed upon the tailpipe, ducting, engine mounts and airframe structure. In order to maintain the AVEN ® nozzle, or any other thrust vectoring nozzle, within allowable side thrust loads, the control system 100 of the present invention limits the vector angle available for a given engine thrust.

More specifically, the block diagram of FIG. 1 depicts the logic flow of control system 100. The essential steps in fulfilling the mission of control system 100 are indicated by the functions of blocks 102, 104, and 106. Block 102 indicates that control system 100 calculates the thrust produced by the gas turbine engine, as described in greater detail hereinafter. Block 104 represents that control system 100 calculates a side load vector angle limit for the thrust vectoring nozzle as a function of the engine thrust calculated in block 102 and a side load limit as explained later herein. Control system 100, as seen by block 106, then automatically limits any vector angle requested of the thrust vectoring nozzle, if greater than the side load vector angle limit, to the side load vector angle limit calculated in block 104.

Figure 2:
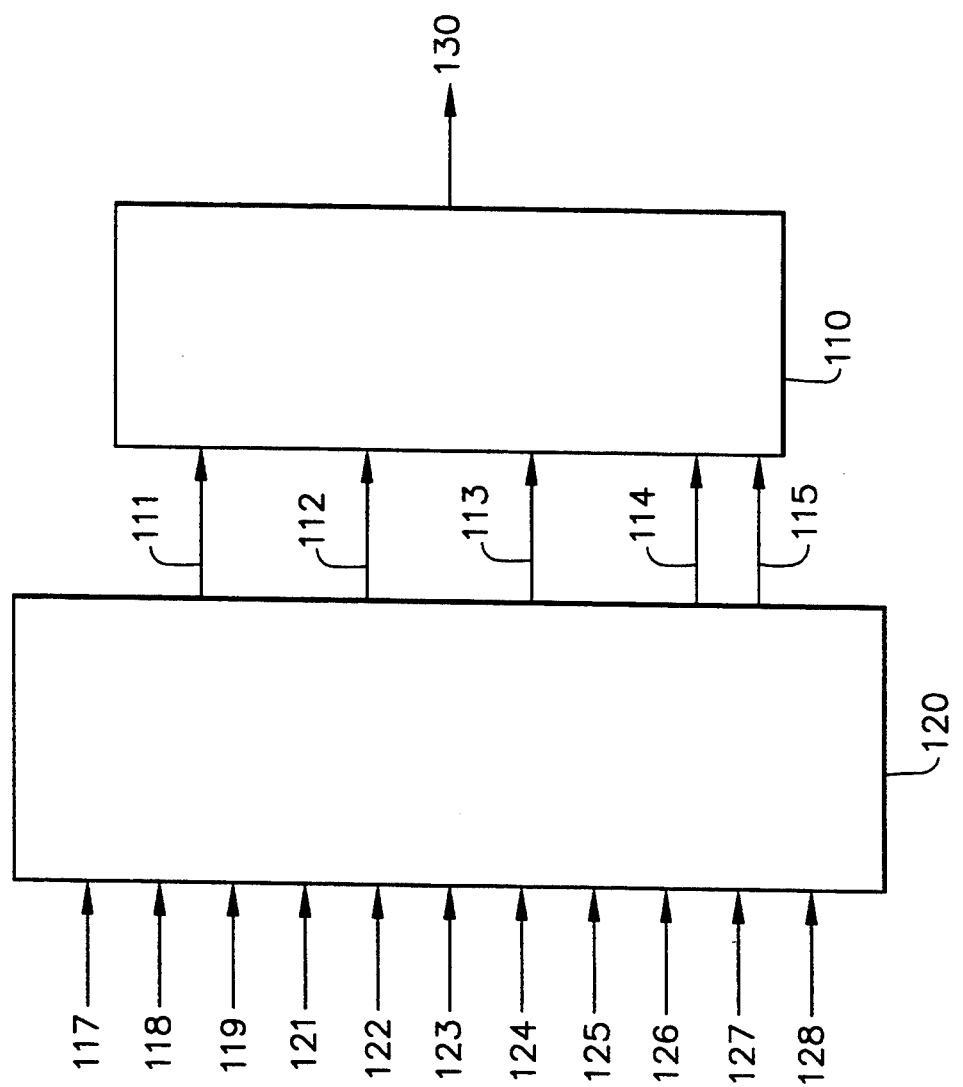
FIG. 2 is a schematic block diagram of the thrust calculations based on pressure, temperature, and mass flow calculations at the throat of the exhaust nozzle and certain thrust input parameters measured by sensors throughout the gas turbine engine.

With respect to the calculation of engine thrust, as represented by block 102 in FIG. 1, such thrust calculation is depicted schematically as being performed by a microprocessor 110 in FIG. 2. In particular, the microprocessor 110 performs the following algorithm:

$$F_g = W_8 \times \sqrt{T_8} \times \sqrt{1 - 1/(P_8/P_{amb})^{k_{nox}}} \times C_{Fg} \times C$$

where $F_g$ = gross engine thrust
$W_8$ = mass flow of gases at nozzle throat (i.e., station 8)
$T_8$ = temperature of gases at nozzle throat
$P_8$ = pressure of gases at nozzle throat
$P_{amb}$ = ambient pressure
$k_{nox}$ = nozzle gas constant
$C_{Fg}$ = thrust coefficient
$C$ = gas correction factor.

Accordingly, it will be understood that engine thrust is calculated principally as a function of pressure ($P_8$), temperature ($T_8$), and mass flow ($W_8$) of the gases at the throat of the thrust vectoring nozzle. Therefore, $W_8$, $T_8$, $P_8$ and $P_{amb}$ are represented by signals 111, 112, 113, and 114, respectively, since they are inputted into microprocessor 110. The ambient pressure ($P_{amb}$) is equivalent to the static pressure measured from the aircraft. For a given nozzle, nozzle gas constant $k_{nox}$ and gas correction factor C will be known and embedded in the software of the microprocessor 110 executing the thrust calculation algorithm. Exemplary values for the nozzle gas constant and gas correction constant of the AVEN ® nozzle are 0.24812 and 3.65593, respectively. The thrust coefficient $C_{Fg}$ is a function of the ratio of the nozzle exit area to the throat area (A9/A8) and the Mach number $M_c$ of the aircraft as determined by a look-up table and is represented by signal 115.

It will also be understood by a review of FIG. 2 that a microprocessor, indicated by the numeral 120, is utilized to calculate the values of mass flow $W_8$, temperature $T_8$, and pressure $P_8$ from various thrust input parameters (as represented by function block 101 in FIG. 1). Although microprocessor 120 is designated separately from microprocessor 110 for purposes of clarity, a single microprocessor (e.g., the Pace 1750A processor, running at 15 MHz.) preferably should be used. Accordingly, microprocessor 120 performs the following algorithms:

$$W_8 = W_2 + W_{ft} - W_B$$

where $W_8$ = mass flow at nozzle throat
$W_2$ = air flow at fan inlet
$W_{ft}$ = total fuel flow
$W_B$ = total bleed air flow and $$W_2 = W_{2r} \times \frac{P_2/14.69 \text{ psia}}{\sqrt{T_2/518.7° \text{ R}}}$$

where $W_{2r}$ = corrected air flow at fan inlet
$P_2$ = pressure at fan inlet
$T_2$ = fan inlet temperature The total bleed air flow $W_8$ is an assumed value in the control logic of microprocessor 120 and for the AVEN ® nozzle has a nominal value of 0.85 pounds per second. The corrected air flow at the fan inlet $W_{2r}$ and the pressure at the fan inlet $P_2$ each are calculated from a look up table as a function of fan speed $N_f$, fan inlet temperature $T_2$, fan exit pressure (static) $P_{s14}$, and fan exit pressure (total) $P_{t25}$. Accordingly, $N_f$, $T_2$, $P_{s14}$, $P_{t25}$ and $W_{ft}$ are designated as input signals 119, 121, 122, 123 and 124 to microprocessor 120. As known in the industry, the standard day temperature is equivalent to 518.7° R and standard day barometric pressure is equivalent to 14.69 psia.

$$T_8 = T_2 + (T_6 - T_2) + (T_8 - T_6)$$

where $T_8$ = temperature at afterburner exit
$(T_6 - T_2)$ = main burner temperature rise
$(T_8 - T_6)$ = afterburner temperature rise
$T_2$ = temperature at fan inlet Thus, $T_8$ is equal to the sum of the temperature at the fan inlet, the main burner temperature rise, and the afterburner temperature rise. It will also be understood that a fan temperature rise is accounted for in main burner temperature rise ($T_6 - T_2$). The main burner temperature rise ($T_6 - T_2$) is calculated from a look up table as a function of the fuel-air ratio ($W_{fm}/W_2$) at the main burner. The fuel flow at the main burner $W_{fm}$ is equivalent to the total fuel flow $W_{ft}$ minus the afterburner fuel flow $W_{fr}$, where the afterburner fuel flow $W_{fr}$ is equivalent to the product of an augmenter fuel parameter $\Phi_{AB}$ and the combustor pressure $P_{sc}$. Accordingly, the main burner temperature rise ($T_6 - T_2$) is calculated from the following:

$$(T_6 - T_2) = f\left[\frac{W_{ft} - (\Phi_{AB} \times P_{sc})}{W_2}\right]$$

Likewise, the afterburner temperature rise ($T_8 - T_6$) is equivalent to a function of the fuel-air ratio ($W_{fr}/W_2$) at the afterburner, as seen by the following:

$$(T_8 - T_6) = f\left[\frac{\Phi_{AB} \times P_{sc}}{W_2}\right]$$

It will be understood that the augmenter fuel parameter $\Phi_{AB}$ and the combustor pressure $P_{sc}$ will be input signals 117 and 118 to microprocessor 120.

$$P_8 = P_{t25} \times (P_{8dry}/P_{t25}) \times (P_{8AB}/P_{8dry})$$

where $P_8$ = pressure at nozzle throat
$P_{t25}$ = total pressure at fan outlet
$(P_{8dry}/P_{t25})$ = cold loss pressure ratio
$(P_{8AB}/P_{8dry})$ = afterburner hot loss pressure ratio The cold loss pressure ratio is calculated from a look up table as a function of fan speed $N_f$, fan inlet temperature $T_2$, fan exit pressure (static) $P_{s14}$, and fan exit pressure (total) $P_{t25}$. Likewise, the afterburner hot loss pressure ratio is also calculated from a look up table as a function of the temperature at the nozzle throat and main burner, $T_8$ and $T_6$, the fan exit pressure (static) $P_{s14}$, and the fan exit pressure (total) $P_{t25}$. The temperature at the main burner $T_6$, in turn, is equivalent to the temperature at the fan inlet $T_2$ added to the main burner temperature rise $(T_6-T_2)$, the calculation of which is described hereinabove. The afterburner exit temperature $T_8$ is calculated by adding the main burner temperature $T_6$ to the afterburner temperature rise $(T_8-T_6)$.

As stated previously, the thrust coefficient $C_{fg}$ is a function of the ratio of the nozzle exit area to the throat area (A9/A8) and the Mach number $M_c$ of the aircraft, so the nozzle exit area A9, the nozzle throat area A8, and the Mach number $M_c$ are each input into microprocessor 120 as indicated by the numerals 126, 127, and 128, respectively. Also, the ambient pressure $P_{amb}$ is input into microprocessor 120 as input 125.

It is an important aspect of control system 100 that it is able to calculate the thrust produced by a gas turbine engine based upon information received from various engine sensors. As seen in FIG. 2, while the thrust calculation depends directly upon parameters $W_8$, $P_8$, $T_8$, $P_{amb}$, and $C_{fg}$, these parameters are, in turn, calculated from the thrust input parameters identified by signals 117-119 and 121-128 (and identified collectively in block 99 of FIG. 1). It is preferred that a verification procedure 98 for thrust input signals 117-119 and 121-128 be incorporated into control system 100. For example, a flag FGINVALID may be set to "true" if any of the sensed thrust input parameters are found to be out of range or otherwise invalid.

Figure 4:
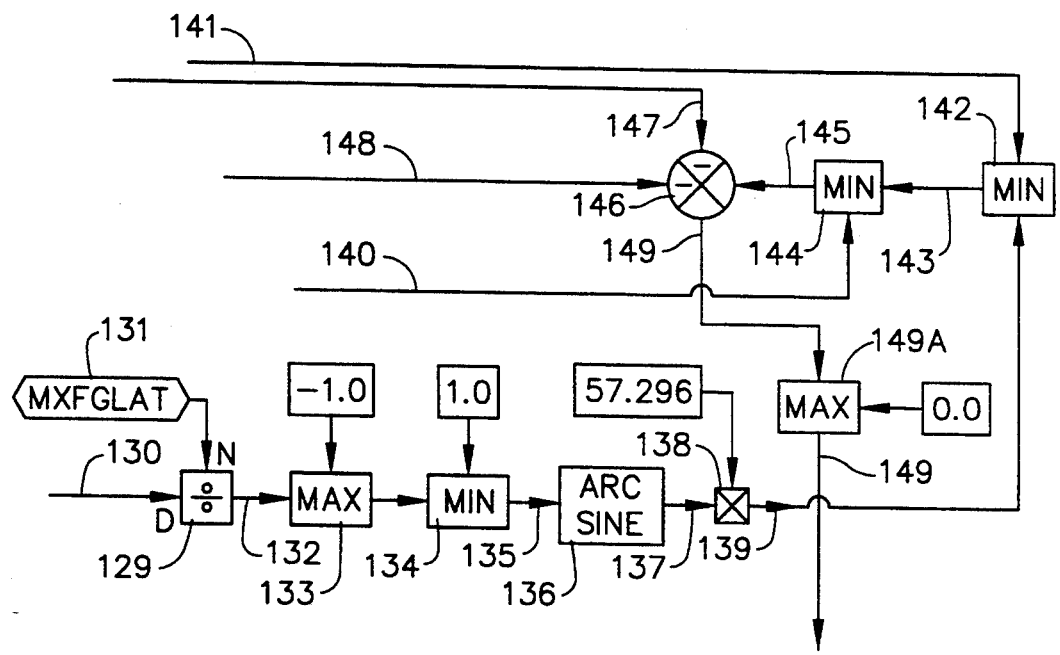
FIG. 4 is a schematic block diagram of the calculation of the side load vector angle limit, as well as a comparison thereof with other vector angle limits.

Once the aforementioned algorithms are processed to calculate the engine's thrust, a side load vector angle limit can then be determined (represented by function block 104 in FIG. 1). More specifically, FIG. 4 depicts the logic for calculating the side load vector angle limit. A signal 130 representing the calculated thrust is divided into a side load limit 131 (MXFGLAT), which is stored in non-volatile memory in function block 129, to produce a ratio signal 132. The side load limit 131 will have a value, which when added to external forces (e.g., gravitational and external air loads), will not exceed limits that are acceptable to the engine and related airframe structures while including an appropriate safety factor. For purposes of the AVEN ® nozzle and its use with General Electric Company's F110 engine, that side load limit is designated as 3,725 pounds.

The ratio signal 132 is then input into maximum and minimum checks 133 and 134 to verify that the value thereof falls within the range of −1.0 to 1.0. In other words, if the side load limit 131 is ever greater than the calculated thrust 130, the ratio will be set to 1.0. Thereafter, a verified signal 135 is sent to function block 136, where the arc sine of signal 135 is taken. Because the output 137 therefrom is in radians, signal 137 is then multiplied by 57.296 in multiplier 138. The output signal 139 is then equivalent to the side load vector angle limit in degrees.

Because the side load vector angle limit 139 is only one vector angle limit within the overall control configuration for a thrust vectoring nozzle, it is preferred that such side load vector angle limit 139 be compared with a flow separation vector angle limit 140 and a mechanical vector angle limit 141. In this way, the lowest of these vector angle limits is used to control the allowable vector angle for the thrust vectoring nozzle.

As seen in FIG. 4, side load vector angle limit signal 139 is first compared to mechanical vector angle limit 141 at a minimum function box 142. The lower of the two vector angle limits becomes the resulting output signal 143, which is then compared to the flow separation vector angle limit 140 at a second minimum function box 144. Accordingly, the lowest vector angle limit is represented by signal 145. Signal 145 is then input into an adder 146, where signals 147 and 148, representing the safety factors for the transient effects of rapid A8 motion and afterburner lighting, respectively, are subtracted therefrom. The output signal 149 is then the minimum overall vector angle limit utilized to control the demand on the thrust vectoring nozzle, and must be equal to or greater than zero as provided by maximum function box 149A (see FIG. 4). Of course, it will be understood for purposes of the present invention that this comparison of vector angle limits is not required, and in such case side load vector angle limit 130 and signal 149 would be equivalent (see FIG. 1).

Figure 5:
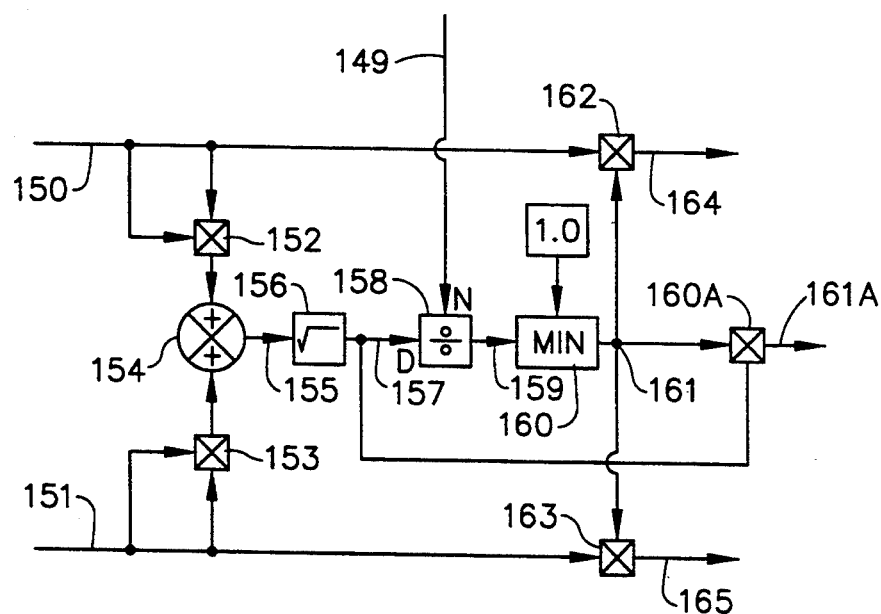
FIG. 5 is a schematic block diagram depicting how the side load vector angle limit is used to limit the vector angle of the thrust vectoring nozzle.

It will be seen in FIG. 5 that separate commands from the cockpit for the thrust vectoring nozzle in the pitch and yaw directions are represented by signals 150 and 151, respectively. While various manual adjustments could be made to signals 150 and 151 for maintenance purposes, they have been omitted for clarity. In an effort to maintain the total vector demand on the thrust vectoring nozzle within the vector angle limit 149, it will be seen that pitch and yaw control signals 150 and 151 are each squared and then added together. These functions are provided by multipliers 152 and 153 and adder 154. Thereafter, the square root of an output signal 155 therefrom is performed by function block 156. Thus, signal 157 represents the magnitude of the total vector angle demanded by the cockpit control. A ratio of the vector angle limit 149 to the total vector angle demanded 157 is performed by function block 158 and is represented by signal 159. Signal 159 is then compared to 1.0 in minimum function box 160, with the resulting output 161 being the lesser of the two. Thus, output signal 161 has a value between 0 and 1. Signal 161 then is input into two multipliers 162 and 163, where it is multiplied with pitch control signal 150 and yaw control signal 151, respectively. In this manner, the allowable pitch demand and yaw demand signals, 164 and 165, are determined and then implemented with respect to the secondary actuator position demands of the thrust vectoring nozzle. Also, signal 161 is multiplied by total demand vector signal 157 in multiplier 160A to form a total allowable vector demand signal 161A.

In particular, it should be noted that the control system 100 of the present invention not only limits the vector angle requested by the cockpit to the vector angle limit, but automatically reduces (or scales back) such requested vector angle as shown in FIG. 5. Therefore, as opposed to a control system involving a dynamic comparison of a calculated side thrust (as a function of the calculated thrust) and thereby limiting the engine thrust or vector angle available therefrom, control system 100 is able to inform the aircraft's flight control system how much total vector angle is available for a given thrust at all times (including before any vector angle is demanded) and automatically limit any requested vector angle (which is greater) thereto. Of course, any vector angle requested which is less than the vector angle limit will be allowed to proceed.

Figure 3:
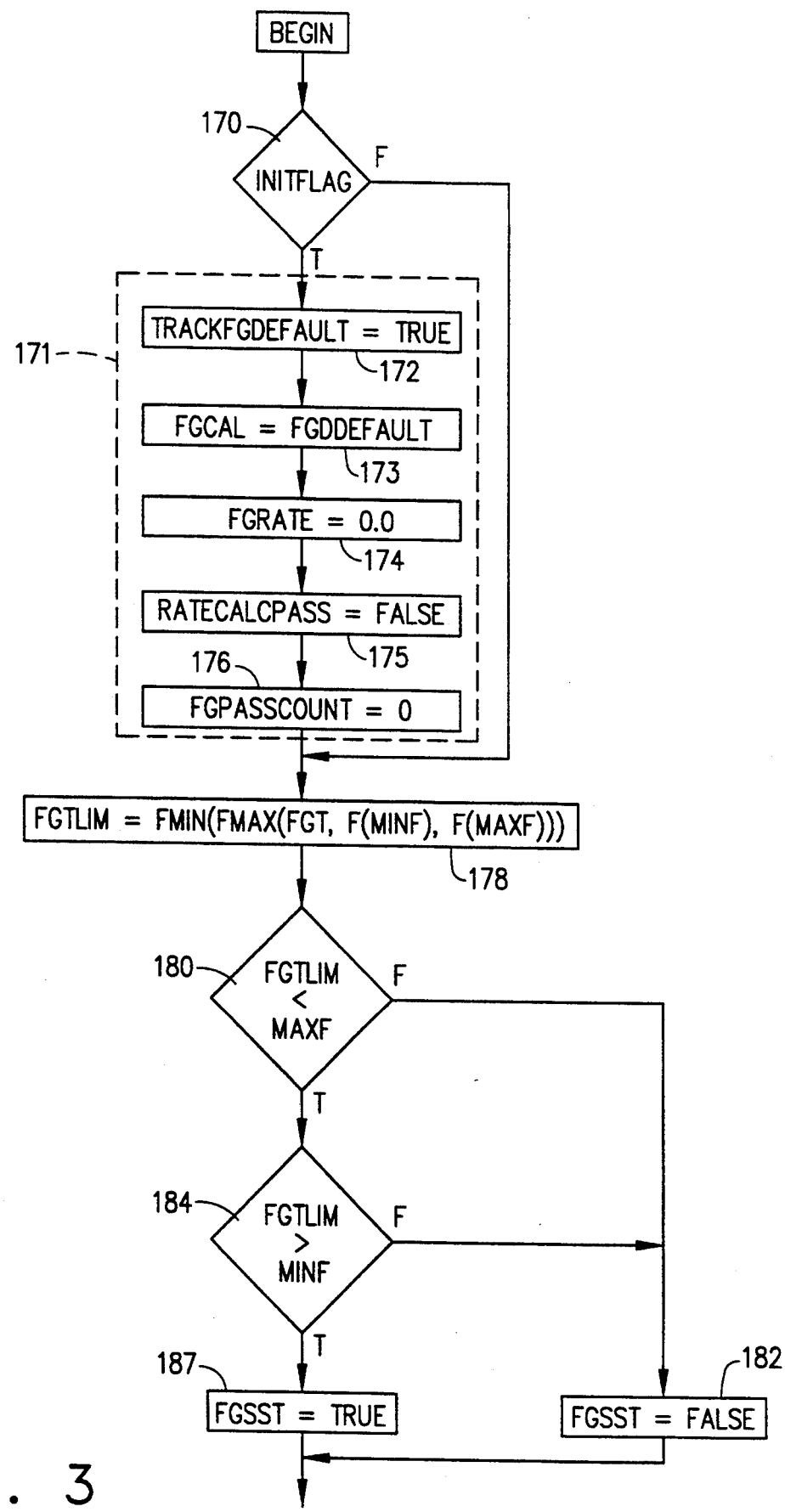
FIGS. 3 and 3A are a flow diagram depicting a verification procedure for the calculated thrust.
Figure 3A:
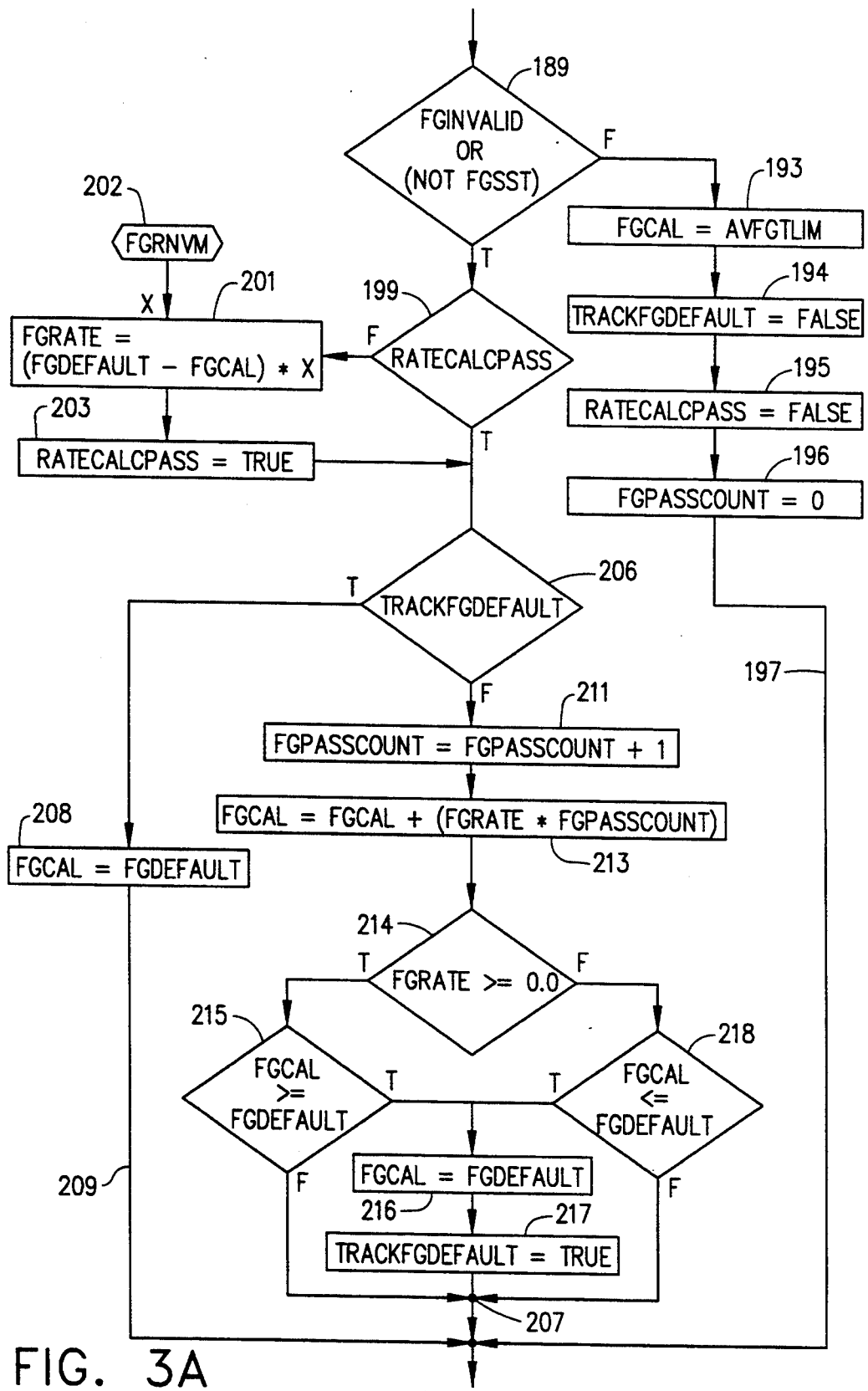

Another aspect of control system 100 is depicted generally in block 103 of FIG. 1 and logically in the flow diagrams of FIGS. 3 and 3A, where the calculated thrust 130 is checked to verify that it falls within a specified range. It will be understood that verification procedure 103 must be initialized on the first iteration. Accordingly, the parameter INITFLAG 170, if true, represents the first pass through verification procedure 103 and therefore certain initial conditions are set as identified collectively at 171. This includes setting the default transition flag (TRACKFGDEFAULT) to true in box 172, setting the calculated thrust (FGCAL) to a thrust default (FGDEFAULT) in box 173, setting the thrust transition rate (FGRATE) to zero in box 174, setting the rate calculation flag (RATECALCPASS) to false in box 175, and the thrust transition counter (FGPASSCOUNT) to zero in box 176.

Thereafter, as represented by box 178, the gross thrust (FGT) is bounded by upper and lower limits stored in non-volatile memory forming a bounded thrust value (FGTLIM). The bounded thrust value (FGTLIM) is then compared first to a maximum allowable thrust (MAXF), which is stored in non-volatile memory, in comparator 180. If the bounded thrust value (FGTLIM) is not less than MAXF (or false), then the thrust validity flag (FGSST) is set to false (or invalid) in flag 182. If bounded thrust value (FGTLIM) is less than MAXF, or true, a comparison is then performed in comparator 184 to determine if the bounded thrust value (FGTLIM) is not greater than a minimum allowable thrust (MINF). If the bounded thrust value (FGTLIM) is not greater than MINF, the thrust validity flag (FGSST) is again set to false (or invalid) in block 182. If the bounded thrust value (FGTLIM) is greater than MINF, then the thrust validity flag is set to true (or valid) in block 187. For the AVEN ® nozzle, MINF and MAXF have been set to −10 pounds and 62,000 pounds, respectively.

As seen at the top of FIG. 3A, it is then determined by decision block 189 whether the thrust is valid (if FGSST=true, then FGINVALID=false) or invalid (if FGSST=false, then FGINVALID=true). If the thrust is valid, functions 193, 194, 195 and 196 are utilized to set the calculated thrust (FGCAL) to the bounded thrust value (FGTLIM), the default transition flag (TRACKFGDEFAULT) is set to false, the rate calculation flag (RATECALCPASS) is set to false and the thrust transition counter (FGPASSCOUNT) is set to zero. Accordingly, the calculated thrust is verified as being within the specified thrust range and is used to calculate the side load vector angle limit as described hereinabove. This is represented by path 197 in both FIG. 3A and FIG. 1.

If decision block 189 determines that the thrust is invalid (true), decision block 199 then determines whether it is the first pass through the transition to default thrust or not. If the answer is false (meaning it is the first pass), function block 201 calculates the thrust transition rate (FGRATE) which is used to transition the calculated thrust to a default thrust. As seen in FIG. 3A, the thrust transition rate (FGRATE) is equal to the difference of the thrust default (FGDEFAULT) and the calculated thrust (FGCAL) multiplied by a time constant factor 202. Time constant factor 202 has been set to 0.00307692 for the AVEN ® nozzle. In addition, the calculation pass flag (RATECALCPASS) is set to true in block 203 since only one pass can be made through the thrust transition rate function block 201 per failure.

Thereafter, a decision block 206 determines if the calculated thrust has transitioned to the default thrust or not. If the decision block 199 determines that it is not the first pass through the transition to default procedure (or true), then decision block 206 immediately determines whether the thrust has transitioned to a default thrust or not. If the thrust has transitioned to the default thrust (true), the calculated thrust (FGCAL) is set to the thrust default (FGDEFAULT) in function block 208. Accordingly, the thrust default value is used to calculate the side load vector angle limit. Otherwise, if the calculated thrust is not the default thrust, the thrust transition counter (FGPASSCOUNT) is incremented in function block 211 and the calculated thrust (FGCAL) is incremented in function block 213 to be equivalent to the sum of the calculated thrust (FGCAL) and the product of the thrust transition rate (FGRATE) and the thrust transition counter (FGPASSCOUNT).

Thereafter, comparator 214 determines whether the thrust transition rate (FGRATE) is greater than or equal to zero. If true, a comparator 215 then determines whether the calculated thrust (FGCAL) is greater than or equal to the default thrust (FGDEFAULT). If the calculated thrust is greater than or equal to the thrust default (true), then flag 216 sets the calculated thrust (FGCAL) equal to the default thrust (FGDEFAULT), the default transition flag is set to true in block 217, and the transition is complete. Accordingly, the default thrust is used to calculate the side load vector angle limit as represented by path 207 in FIGS. 3A and 1.

If the transition rate (FGRATE) is not greater than or equal to zero (false), as determined by comparator 214, then comparator 218 determines whether the calculated thrust (FGCAL) is less than or equal to the default thrust (FGDEFAULT). If the calculated thrust is less than the default thrust (true), then the calculated thrust (FGCAL) is set to the default thrust (FGDEFAULT) in flag 216 and the default transition flag is set to true in block 217, as described above, meaning the transition is complete. Accordingly, the default thrust is used to calculate the side load vector angle limit. Thereafter, the default thrust is used to calculate the side load vector angle limit, as shown by path 209.

The resultant transition to the default thrust upon a failure will therefore be non-linear, as seen by the nature of function 213. This prevents the side thrust vector angle limit from instantaneously dropping below the sensed vector angle, which would be a fault condition.

For the purposes of this invention, the default thrust FGDEFAULT is calculated to be a conservatively high maximum power thrust value based on aircraft static pressure. (Since the ambient pressure $P_{amb}$ is equivalent to the static pressure measured from the aircraft, FGDEFAULT=$(P_{amb} \times 2268.6) + 6184.6)$.

Should the aircraft static pressure be found invalid, a value of 35,000 pounds preferably is used.

Figure 6:
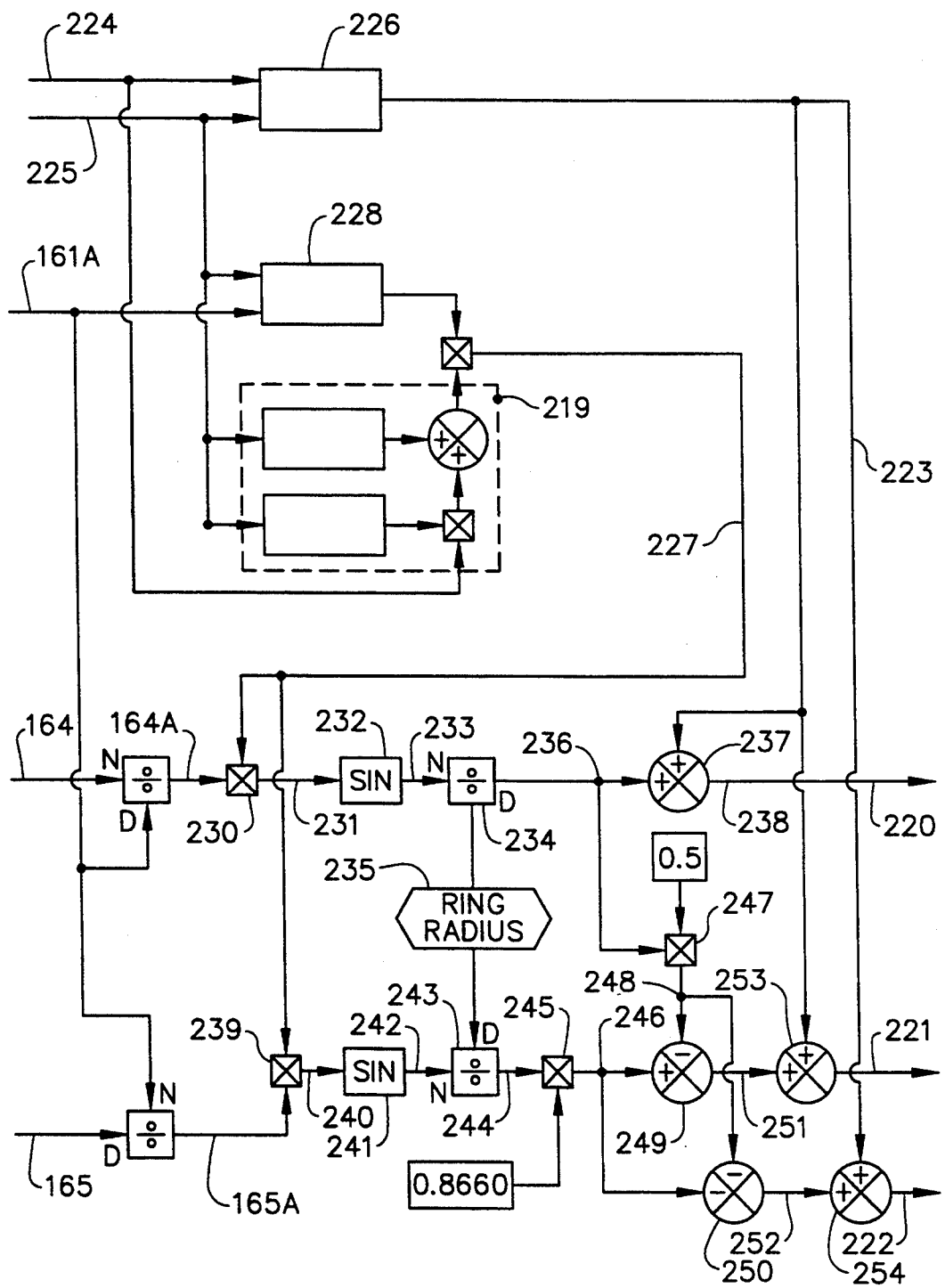
FIG. 6 is a schematic block diagram of how the side load vector angle limit is effected on the secondary actuator position demands of the thrust vectoring nozzle.

FIG. 6 depicts how the pitch and yaw demand signals, 164 and 165, are utilized to control the secondary actuators of the AVEN® nozzle (also known as the nozzle kinematics). Secondary actuator position demands 220, 221 and 222 represent demands for the secondary actuators in the 12 o'clock, 4 o'clock, and 8 o'clock positions referred to previously. It will be seen in the upper half of FIG. 6 that the slide (or translation) demand 223 of the secondary ring (A9 slide) and the tilt demand 227 of the secondary ring (A9 tilt) have a direct effect on the secondary actuator position demands 220, 221, and 222. The secondary ring slide demand, represented by signal 223, is a function of the area ratio demand (A9/A8) and the throat area of the nozzle (A8), which are represented by signals 224 and 225 input into look up table 226. The tilt demand of the secondary ring, represented by signal 227, is a function of the total allowable vector demand 161A and the throat area 225, taking into account certain conversion correction factors 219, based on throat area A8 input into look up table 228.

As seen in the lower half of FIG. 6, the secondary actuator position demand 220 is not affected by the yaw demand signal 165, whereas secondary actuator position demands 221 and 222 are affected by both pitch and yaw demand signals 164 and 165. With respect to secondary actuator position demand 220, the pitch demand signal 164 is first divided by the total allowable vector demand signal 161A to establish a pitch component signal 164A which is then multiplied by ring tilt demand signal 227 in multiplier 230. The signal 231, which represents the pitch component of ring tilt, then enters function block 232, where the sine of signal 231 is taken. Signal 233 represents the sine of signal 231 in radians and is sent to a function block 234, where it is divided by the secondary ring radius 235 of the nozzle (stored in non-volatile memory). Ratio signal 236 is then added to the secondary ring slide demand signal 223 in adder 237 and the result is the secondary actuator position demand 220.

With respect to secondary actuator position demands 221 and 222, yaw demand signal 165 is first divided by the total allowable vector demand signal 161A to establish a yaw component signal 165A which is then multiplied by secondary ring tilt demand signal 227 in a multiplier 239. The sine of the yaw component of ring tilt, which is depicted by signal 240, is performed in function block 241, with the resulting signal 242 being divided by the secondary ring radius 235 in function block 243. The resulting ratio signal 244 is multiplied by 0.866 (cosine of 30°) in multiplier 245 to obtain signal 246. This is to reflect the fact that the 4 o'clock and 8 o'clock secondary actuators are 0.866 the distance from the yaw centerline that the 12 o'clock secondary actuator is from the pitch centerline. In recognition of the fact that the secondary actuators at the 4 o'clock and 8 o'clock positions have twice the effect on the pitch actuation (since they are 0.5 the distance from the pitch centerline than the 12 o'clock secondary actuator), the pitch component of those actuators (i.e., ratio signal 236) is multiplied by one-half in multiplier 247. The resulting signal 248 is then subtracted from signal 246 in adder 249 and subtracted from signal 246 in adder 250. Signal 246 is positive in adder 249 and negative in adder 250 to reflect the fact that yaw vectoring requires the 4 o'clock and 8 o'clock secondary actuators be offset in an equal amount but opposite directions. It will also be understood that signal 248 is subtracted from signal 246 in adders 249 and 250 to reflect that the secondary actuators in the 4 o'clock and 8 o'clock positions have the opposite effect on pitch vectoring when compared to the secondary actuator at the 12 o'clock position. The resulting signals, 251 and 252, respectively, are added to secondary ring slide demand signal 223 in adders 253 and 254 to obtain secondary actuator position demands 221 and 222. Accordingly, it is seen that the secondary ring slide demand signal 223 is a component of each secondary actuator position demand.

Having shown and described the preferred embodiment of the present invention, further adaptations of the invention can be accomplished by appropriate modifications by one of ordinary skill in the art without departing from the scope of the invention.

What is claimed is:

1. A method for controlling the vector angle of a thrust vectoring exhaust nozzle in a gas turbine engine, the method comprising the steps of:
   (a) calculating engine thrust produced by said gas turbine;
   (b) calculating a side load vector angle limit as a function of said calculated engine thrust and a side load limit; and
   (c) limiting any vector angle requested of said thrust vectoring exhaust nozzle to said side load vector angle limit.

2. The method of claim 1, wherein any vector angle requested of said thrust vectoring exhaust nozzle that is greater than said side load vector angle limit is automatically reduced to said side load vector angle limit.

3. The method of claim 1, wherein the step of calculating said side load vector angle includes the following steps:
   (a) dividing said side load limit by said calculated engine thrust to produce a ratio;
   (b) taking the arc sine of said ratio to produce a vector angle in radians; and
   (c) converting said vector angle from radians to degrees.

4. The method of claim 1, further including the step of verifying the calculated engine thrust is within a specified range.

5. The method of claim 1, further including the steps of comparing said side load vector angle limit to other vector angle limits of said thrust vectoring exhaust nozzle and utilizing the least of these to limit any vector angle requested of the thrust vectoring exhaust nozzle.

6. The method of claim 1, wherein said thrust vectoring exhaust nozzle is axisymmetric.

7. The method of claim 1, wherein said side load limit is in the range of 3000–4000 pounds.

8. The method of claim 1, wherein said calculated engine thrust is accomplished from information available from sensors within said gas turbine engine.

9. The method of claim 1, wherein said step of calculating said engine thrust includes multiplication of the following:
   (a) mass flow at a throat of the thrust vectoring exhaust nozzle;
   (b) the square root of a temperature at said throat of the thrust vectoring exhaust nozzle;
   (c) a thrust coefficient at an exit plane of the thrust vectoring exhaust nozzle;
   (d) a gas correction factor; and (e) the square root of one minus an inverted parameter, said parameter being equivalent to a ratio of a pressure at said throat of the thrust vectoring exhaust nozzle to an ambient pressure raised to the power of a nozzle gas constant.

10. The method of claim 9, wherein said throat temperature is equivalent to the sum of a temperature of gases at a fan inlet of the gas turbine engine, a temperature rise produced by a fan of the gas turbine engine, a temperature rise produced by a main burner of the gas turbine engine, and a temperature rise provided by an afterburner of the gas turbine engine.

11. The method of claim 10, wherein the main burner and afterburner temperature increases are a function of fuel-to-air ratios at said main burner and afterburner.

12. The method of claim 9, wherein said throat pressure is equivalent to the product of:
    (a) pressure at a fan outlet of the gas turbine engine;
    (b) a cold loss pressure ratio which is a function of a fan speed, fan inlet temperature, fan exit static pressure and fan exit total pressure of the gas turbine engine; and
    (c) a hot loss pressure ratio which is a function of temperature at a nozzle throat, temperature of said main burner, said fan exit static pressure and said fan exit total pressure.

13. The method of claim 9, wherein said throat mass flow is equivalent to:
    (a) the sum of total fuel flow through the gas turbine engine and air flow at a fan inlet of the gas turbine engine; and
    (b) said sum having subtracted from it a total bleed air flow.

14. The method of claim 9, wherein said thrust coefficient is a function of:
    (a) a ratio of an area at an exit plane of the nozzle to an area at the nozzle throat; and
    (b) a mach number of an aircraft powered by the gas turbine engine.

15. The method of claim 4, wherein said calculated engine thrust is set to a default thrust if said calculated engine thrust is outside a specified range.

16. The method of claim 4, wherein said specified range is $-10$ to 62,000 pounds.

17. The method of claim 2, further comprising the steps of:
    (a) multiplying a requested pitch vector angle and a ratio of said side load vector angle limit to a total vector angle requested to produce an allowed pitch vector angle; and
    (b) multiplying a requested yaw vector angle and a ratio of said side load vector angle limit to said total vector angle requested to produce an allowed yaw vector angle;
    wherein said total vector angle requested is equivalent to the square root of the sum of said requested pitch vector angle squared and said requested yaw vector angle squared.

18. The method of claim 13, wherein said air flow at the fan inlet is equivalent to the product of:
    (a) corrected air flow at said fan inlet; and
    (b) a ratio of pressure at said fan inlet to a standard day pressure divided by the square root of a ratio of a temperature at said fan inlet to a standard day temperature,
    wherein said corrected air flow and said fan inlet pressure is a function of fan speed, fan inlet temperature, fan exit static pressure, and fan exit total pressure.

19. The method of claim 4, wherein said calculated engine thrust is set to a default thrust if any input to the thrust calculation is deemed invalid.

20. The method of claim 15, wherein said default thrust is calculated from an aircraft static pressure.

21. The method of claim 15, wherein the setting of said calculated engine thrust to said default thrust is accomplished in a non-linear fashion, whereby vectoring of said nozzle at a reduced magnitude is permitted.

* * * * *